Aug. 1, 1950  R. H. MOSS  2,517,405
MOWER BLADE

Filed Jan. 21, 1946  2 Sheets-Sheet 1

INVENTOR
R. H. MOSS
Patterson, Wright & Patterson
ATTYS.

Aug. 1, 1950 R. H. MOSS 2,517,405
MOWER BLADE
Filed Jan. 21, 1946 2 Sheets-Sheet 2
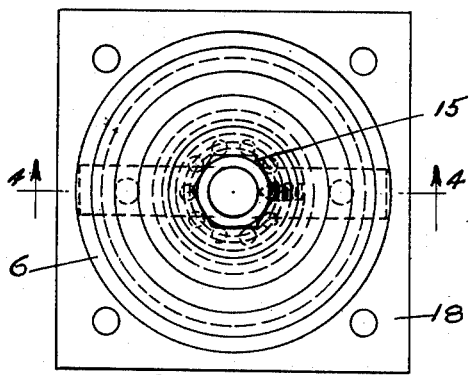
Fig.5.
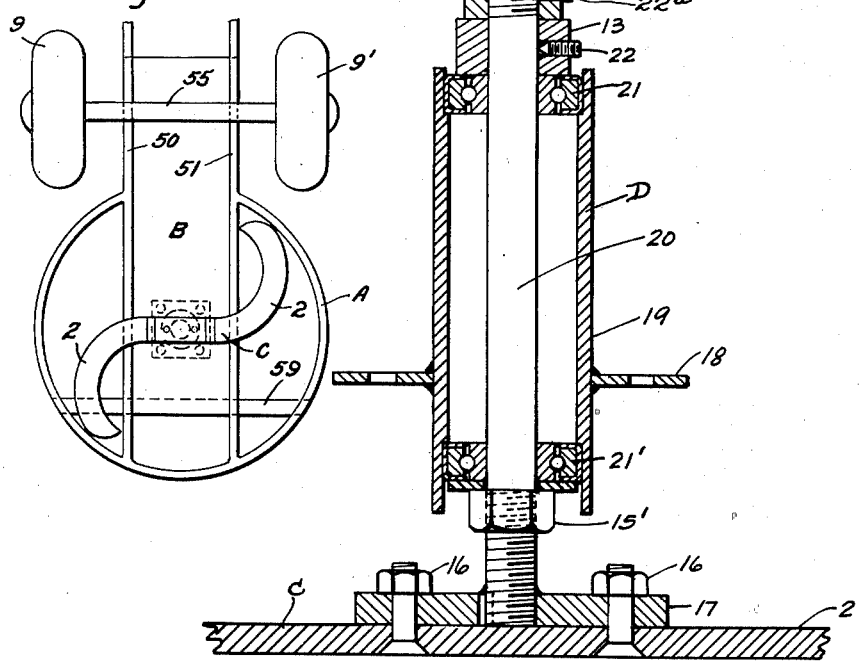
Fig.6.
Fig.4.
INVENTOR
R. H. MOSS
BY
ATTORNEYS Patented Aug. 1, 1950

2,517,405

UNITED STATES PATENT OFFICE 2,517,405

MOWER BLADE

Raymond H. Moss, Freeport, Ill.

Application January 21, 1946, Serial No. 642,587

1 Claim. (Cl. 56—25.4)

This invention relates to mowers and pertains more particularly and specifically to a motor operated mower, generally of the so-called lawn mower type, which is suitable for cutting grass or weeds.

The primary object of the invention is the provision of a novel and improved mower which is simple of operation yet highly efficient in performance.

A still further object of the invention is the provision of a mower having therein a cutting blade of improved construction and operation and which is efficient and durable and will efficiently cut not only soft grass but also heavy stalks of grass, weeds, grain or the like.

A still further object of the invention is the provision of a mower having therein a cutting blade constructed to operate in a manner to avoid tangling of the material being operated upon about the blade or its drive shaft.

Another and still further object of the invention is the provision of a mower which can be operated in close proximity to walls or the like without danger of injury to the cutting blade.

A still further object of the invention is the provision of a mower having novel and improved means for adjusting the cutting blade in respect to the ground so as to selectively determine the height at which the material is to be cut.

Other objects, novel features of construction and improved results of the invention will appear from the following description when head in the light of the accompanying drawings.

In the drawings:

Figure 4 is a vertical sectional view through the supporting and adjusting means for the mower blade, the view being taken on the line 4—4 of Fig. 5.

Figure 5 is a top plan view of the structure appearing in Figure 4.

Figure 6 is a fragmentary inverted bottom view of the mower illustrating the supporting and protective frame for the mower blade.

Figure 1:
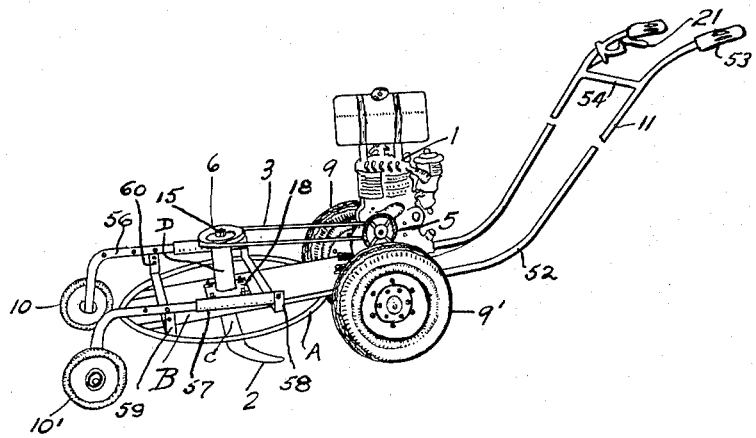
Figure 1 is a perspective view of a mower embodying the present invention.

Referring now to the drawings in which like parts are designated by similar reference characters and numerals throughout the description, a tubular frame is provided and this composed in part of a pair of spaced parallel side bars 50 and 51 which have their rear ends bent upwardly at 52 and terminate in a pair of handles 53. Adjacent their ends the side bars are braced by a cross connecting arm 54. Secured to and formed as a part of the frame is a circular tubular frame which comprises a guard A which will later be referred to.

Forward of their upwardly bent portions the side bars are suitably secured to a transversely extending axle 55 carrying at its ends rubber tired wheels 9 and 9'. At its forward end the tubular frame is supported upon spaced front wheels 10 and 10' each of which is rotatably mounted upon the downwardly bent forward end of a supporting arm 56 each of which is adjustably slidably secured in a sleeve 57. These sleeves are supported at their rear ends upon a transverse bracket 58 which in turn is secured to a platform B mounted upon the spaced side arms 50 and 51 of the frame. In addition to being supported within the sleeves 57 the front wheel supporting arms 56 are supported upon a transversely extending bracket 59.

A motor 1 is mounted upon the rear end of the platform B and is illustrated as being a gas engine.

The mower blade is designated as an entirety at C and is secured as at 16 to a plate 17 which is keyed to the lower end of a vertically extending shaft 20 for rotation therewith. The shaft 20 extends through an elongated vertically disposed casing D provided exteriorly with a plate 18 which rests upon and is secured to the upper face of the platform B. At its opposite ends a casing D is provided with roller bearings 21 and 21' surrounding the shaft 20. The shaft extends upwardly beyond the upper end of the casing D and is provided with a pulley 6 over which is trained a belt 3 which runs to a pulley 5 on and driven by the motor 1. The construction thus far described provides a rotative drive means for the mower blade.

Vertical adjustability of the mower blade is obtained through vertical movement of the shaft 20 which is provided for by threading the opposite ends of the shaft 20 and providing thereon upper and lower nuts 15 and 15'. 13 is a thrust bearing for the pulley 6 and is rotatable with the shaft by reason of the set-screw 22. When the shaft is raised or lowered the set-screw 22a of the pulley should be momentarily loosened.

The structure thus far described in respect to the front wheels provides means to adjustably position them in respect to the mower blade. Adjustment is further provided for raising and lowering the front end of the mower. This is accomplished by providing the uprights of the bracket 59 with a plurality of bolt openings 60 which permits the wheel supporting arms 56 to be selectively secured vertically of the bracket 59.

Figure 3:
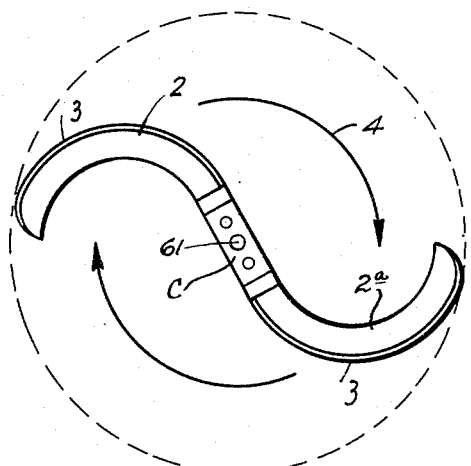
Figure 3 is a top plan view of the mower blade.
Figure 2:
Figure 2 is a side view of the mower blade.

The mower blade is novelly constructed. It is illustrated as being made in a single piece and comprises a pair of blade arms 2 and 2a which are rotated in the direction indicated by arrows 4 in Figure 3 of the drawings. The leading edges 3 of the blades are their cutting edges and each of the blades, so far as their cutting edges are concerned, is curved throughout its length. The curvature of the blades is away from the direction of blade rotation and this curvature is such that if the grass, weed or stalk is not instantly severed by impact of the blade therewith the grass, weed or stalk tends to slide on the cutting edge of the blade so that a shearing action takes place and this shearing action will quickly sever the heaviest stalks. It is intended that the blade be rotated rapidly and it has been found that a speed of from 600 to 800 R. P. M. produces highly satisfactory results. When so rotated the blade cuts much as does the blade of a scythe in that there is a combination of impact and shear. The curvature of each of the blades is a segment of a circle the diameter of which is substantially one-half that of the circle inscribed by the rotation of both of the blades. These blades are arranged in respect to each other so that if they were completely circular in shape their peripheries would contact at one point and it is at the point where the peripheries would contact that the shaft 20 is connected to the blades. The connection of the shaft to the blades is indicated at 61 in Figure 3 of the drawings. A blade made as described is a distinct improvement over a straight edge blade. A straight edge blade tends to tangle up the stalks in the center and to break them off without completely severing them, particularly heavier stalks, which is not true of the present blade the action of which is to cleanly sever the stalk even the heavier ones. Because of the shearing action of the blades no uncut ridge is left when grass is being cut and long grass or weeds will not wind around the blades of the shaft as is the case with a straight blade.

It is intended that the motor be capable of rotating the blade 3000 R. P. M. if desired and the speed of the rotation of the blade is under convenient control by carrying a motor control 12 up to one of the handles of the mower.

From the foregoing description and from the disclosures of the drawings it will be seen that in addition to providing vertical adjustment of the cutter blade itself the blade can be raised and lowered in respect to the ground, through vertical adjustment of the front wheel supporting arms 56 on the brackets 59. Additionally the front wheels can be moved rearwardly towards or forwardly away from the cutter blade. The circular guard makes it possible to use the mower close against a wall or building without danger of injuring the cutter blade. This guard additionally acts, in respect to tall grass, weeds or stalks, to bend them over as the mower is progressed.

The machine will operate very efficiently and by reason of being self-powered a mowing operation can be quickly and easily completed.

The mower is not limited to use in respect to any specific growth nor to the exact specific arrangement illustrated in the drawings, and accordingly the invention is to be limited only within the scope of the hereinafter following and appended claim.

I claim:

In a wheeled grass, weed or like cutter, a substantially flat S-shaped cutter blade supported for rotation in a horizontal plane, the axis of rotation of said blade being at a point midway the length of the blade, the convex curved portions of said blade constituting the cutting edge thereof, said convex curved portions each being contoured to approximate substantially 90° of a circle whose diameter is one-half of the diameter of the circle described by the tips of the blade when rotated, the perimeters of the circles upon which said convex curved portions of the blade are described each lying wholly within the circle described by the tips of the blade when rotated and passing through the axis of rotation of the blade, the outer end of each of said blades being disposed behind the cutting edge of the blade, and the blade ends being disposed inside of the circle described by the cutting edges of the blades.

RAYMOND H. MOSS.

REFERENCES CITED

The following references are of record in the file of this patent:

UNITED STATES PATENTS

| Number | Name | Date |
|---|---|---|
| 1,744,597 | Vasconcellos | Jan. 21, 1930 |
| 1,868,347 | Cloud | July 19, 1932 |
| 2,114,096 | Noel | Apr. 12, 1938 |
| 2,305,719 | Lee | Dec. 22, 1942 |
| 2,329,185 | Coddington | Sept. 14, 1943 |
| 2,374,533 | Fulton | Apr. 24, 1945 |
| 2,403,236 | Phelps | July 2, 1946 |